G. L. & W. M. Howland,
Stump Elevator.
No. 102,544. Patented May 3, 1870.
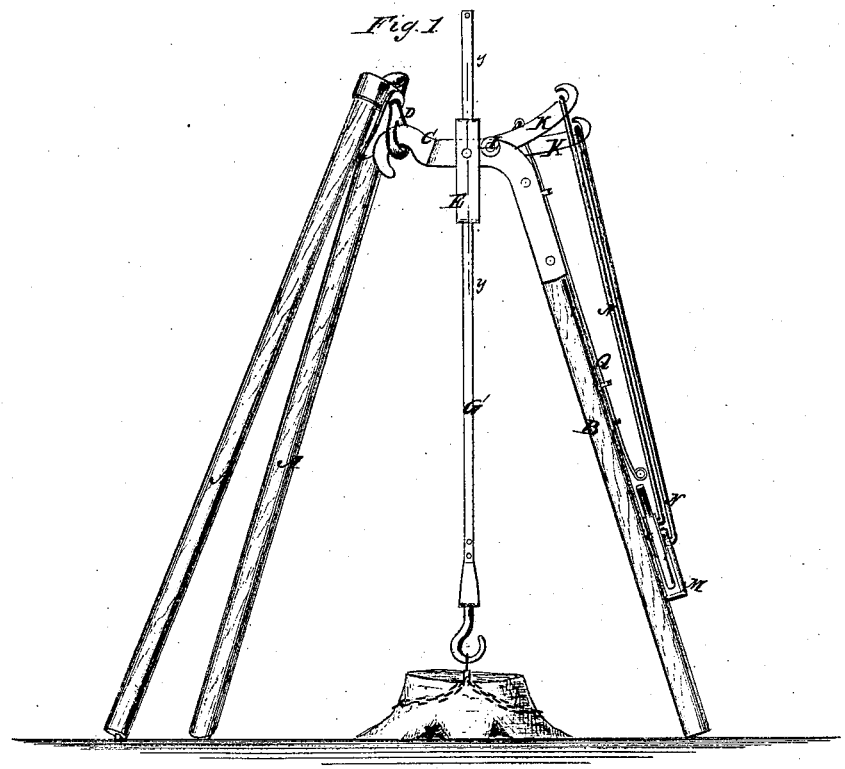
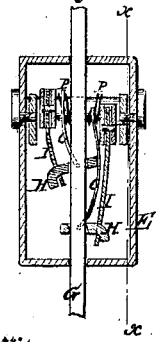
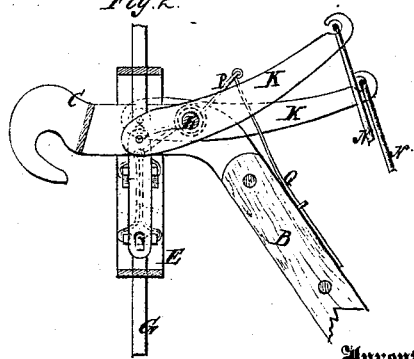
Witnesses:
S. S. Mabee
Alex F. Roberts
Inventor:
Geo. L. Howland
Wm. M. Howland
Per Munn & Co.
Attorneys.

United States Patent Office.

GEORGE L. HOWLAND AND WILLIAM M. HOWLAND, OF TOPSHAM, MAINE.

Letters Patent No. 102,544, dated May, 3, 1870.

IMPROVED STUMP-EXTRACTOR.

The Schedule referred to in these Letters Patent and making part of the same

*To all whom it may concern:*

Be it known that we, GEORGE L. HOWLAND and WILLIAM M. HOWLAND, of Topsham, in the county of Sagadahoc and State of Maine, have invented a a new and improved Stump-Extractor; and we do hereby declare that the following is a full, clear, and exact description thereof, which will enable others skilled in the art to make and use the same, reference being had to the accompanying drawings forming part of this specification.

This invention relates to improvements in machines for pulling stumps or lifting heavy weights, and consists in a combination on a portable frame of a vibrating guiding-frame, a hoisting-bar, a pair of gripe-pawls, operating-levers and adjusting-springs, the latter for shifting the action of the pawls to cause them to raise or lower the bar, all as hereinafter specified.

Figure 1 is a side elevation of our improved stump extractor.

Figure 2 is a partial sectional elevation of the same, taken on the line *x–x* of fig. 3.

Figure 3 is a section of the same, taken on the line *y y*, of fig. 1.

Similar letters of reference indicate corresponding parts.

In this instance the frame is composed of the two legs A and the leg B, hooked together at the top by the long crotched and bent hook C and the swivel D.

E is a metal frame suspended on the hook C by the pivot-bolts F.

G is the square hoisting-bar arranged to slide up and down through suitable holes in the top and bottom of the frame E.

H represents gripe-pawls with square holes through which the bar G passes; they are suspended by rods I from the short arms of the levers K pivoted on the axis L, and connected at their long ends to the vibrating hand-lever M by the rods N, one on each side of its axis, so that when one moves one way the other moves the other.

The said gripe-pawls are also connected by small rods O to spring-levers F, also pivoted on the axis L, and connected to the bar Q on the leg B, arranged to slide up and down thereon.

When this bar Q is shoved up, the spring-levers press the pawls down and cause them to gripe the bar as soon as the levers K begin to draw them up, thereby causing the bar to be raised by the alternate up-and-down movement of the pawls, and when the bar Q is shoved down the springs have a lifting action on the pawls, which prevents their griping the bar until near the end of the upward movement of the levers, so that the further upward movement will lift the bar out of the gripe of the pawls below, which being thereby freed will rise on the bar, while it is lowered by the other until near the end of its upward movement, when, as before, this one will gripe and force the bar from the other at the lower position, and so on letting the bar down.

It will be seen, therefore, that the springs shift the pawls readily to cause them to raise or lower the bar as may be required.

The swinging-frame gives the bar freedom to work obliquely on either side of a vertical plane, and in case it requires to vibrate perpendicularly thereto, the hook and leg K will vibrate in that direction.

Having thus described our invention,

We claim as new, and desire to secure by Letters Patent—

1. The combination of the lifting-bar, the griping-pawls, levers, working-levers, rods, and the shifting-springs, substantially as specified.

2. The combination with the crotched hook and lifting-bar of the swinging frame, substantially as specified.

GEORGE L. HOWLAND.
WILLIAM M. HOWLAND.

Witnesses:
SWANSY WILSON,
CHARLES W. WILSON.